May 8, 1951     K. E. LUGOSCH     2,552,504
VOLTAGE REGULATOR TESTING APPARATUS
Filed Jan. 29, 1946
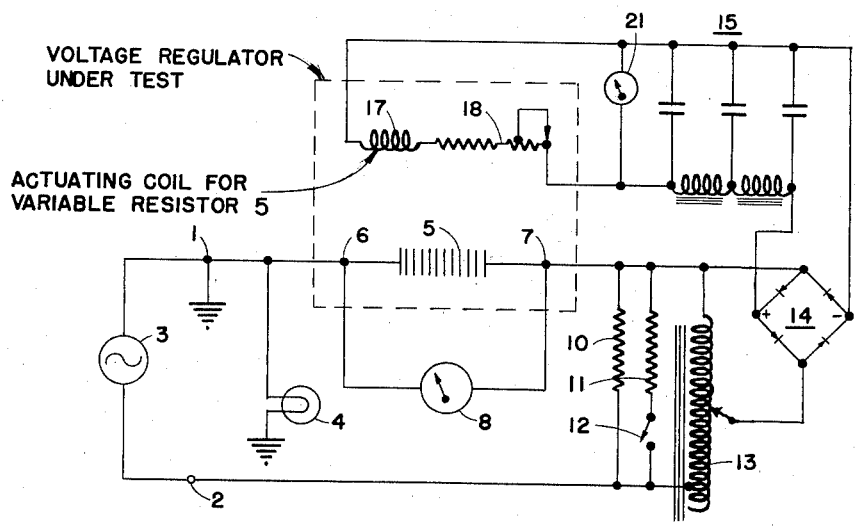
INVENTOR.
KARL E. LUGOSCH
BY
ATTORNEY Patented May 8, 1951

2,552,504

UNITED STATES PATENT OFFICE 2,552,504

VOLTAGE REGULATOR TESTING APPARATUS

Karl E. Lugosch, Union City, N. J.

Application January 29, 1946, Serial No. 644,153

7 Claims. (Cl. 175—183)

This invention relates to electrical testing apparatus, and more particularly to an electrical testing apparatus for adjusting carbon pile voltage regulators.

Regulation of the output voltage of electrical power generators is accomplished in numerous ways; one of the methods by which it may be accomplished is to incorporate a carbon pile voltage regulator in the power supply circuit. For example, where a generator is employed to charge a battery, the output of the generator being subject to variation with load and speed, a carbon pile voltage regulator may be used to vary the field current applied to the generator so that as the output voltage of the generator tends to increase, the field current is reduced and conversely as the output voltage of the generator tends to decrease, the field current is increased. A conventional carbon pile voltage regulator usually consists of a carbon pile stack which varies in resistance depending on how tightly the carbon discs are held together, the resistance decreasing as the carbon discs are pressed more tightly together. A potential coil and an associated armature may be arranged in the regulator so that when, for example, a higher voltage is applied to the potential coil, the armature works against a spring and decreases the compression on the carbon pile. The carbon pile then has greater resistance and allows less current to flow through it. When a carbon pile voltage regulator is used with a generator, the carbon pile is in series with the generator field circuit and the potential coil is connected across the generator output terminals. Thus, when the generator output voltage changes, the resistance of the carbon pile changes, thereby changing the field current of the generator and tending to prevent changes in the output voltage.

Tests indicate that the output voltage of a maladjusted, unstable regulator fluctuates as a sawtooth wave having a frequency of roughly 20 C. P. S. The effective (R. M. S.) output sawtooth voltage of an unstable regulator is only a few per cent higher than the stable output voltage. But the effective (R. M. S.) charging current to a storage battery may be from two to sixty times the average value. This increase in effective charging current may be very injurious to the battery, causing high temperature in the battery and shorting of the plates. The damage to the battery is especially serious in actual service because of the voltage rise that usually accompanies regulator instability. These results explain the field experience of having carbon pile voltage regulators become unstable and causing the battery to burn up or explode.

Thus for any given set of conditions the carbon pile regulator must be adjusted so that the required compensation is attained. The characteristics of a carbon pile regulator may be adjusted in several ways: the major adjustments are achieved by changing the pressure on the pile by adjusting a set screw and by varying the electromagnetic characteristics of the potential coil and the armature associated therewith; a further adjustment is possible by adjusting a rheostat associated with the regulator to vary the level of the potential applied to the potential coil of the regulator. However, in order to make these adjustments to render the regulator operable for a given set of operating conditions, heretofore it has been regarded as necessary either to duplicate the operating conditions, or to make the adjustment while the carbon pile regulator is connected in the circuit with which it is intended to be employed. In practice, either of these alternatives is often difficult to employ.

An object of the present invention is to provide a simple and efficient electrical testing apparatus, and more particularly an electrical testing apparatus for adjusting voltage regulators.

In accordance with one embodiment of the present invention an electrical testing apparatus is provided for adjusting voltage regulators of the type including variable resistance means, such as a carbon pile, and varying potential responsive means for controlling the variable resistance means. The apparatus includes a load network having an output circuit fed from a source of potential through the variable resistance means, and means supplying a predetermined potential output from the network to the varying potential responsive means. Means are also provided for varying the load offered by the network in a predetermined manner as well as means indicating the network output voltage and voltage variations across the variable resistance means.

Other objects and advantages of the present invention will be apparent from the following detailed description taken in conjunction with the drawing, wherein the single figure is a schematic diagram showing an electrical testing apparatus constructed in accordance with one embodiment of this invention and suitable for testing D. C. type carbon pile voltage regulators.

Referring now to the drawing, it will be seen that this testing apparatus includes a pair of line terminals 1 and 2 which may be connected to any suitable source of alternating current 3 having a substantially constant voltage output. With the test circuit illustrated, it is desirable that the polarity of the applied voltage be such that the terminal 1 be negative. Accordingly, in order to facilitate determining the polarity of the applied voltage, a lamp 4 may be connected in series between the terminal 1 and ground. If the lamp lights when voltage is applied to the terminals 1 and 2, the leads to the terminals should be reversed.

The line voltage is applied to a load network through the variable resistance means or carbon pile 5 of the voltage regulator to be tested. Terminals 6 and 7 are employed for connecting the carbon pile 5 in the foregoing manner. In order to measure the voltage drop across the carbon pile 5 a voltmeter is connected in parallel therewith as shown. The load network includes resistances 10 and 11 and a variable auto transformer 13. The resistance 10 is positively connected to the network and is of a value sufficient to simulate the field resistance of the generator, or no load conditions. The resistance 11 may be connected in the network upon operation of switch 12 and is of sufficient value to simulate full load conditions. The values of the resistances 10 and 11 are selected in accordance with the load condition to be simulated.

The output voltage from the load network is applied to a rectifier circuit 14. In the drawing a selenium bridge type rectifier has been shown. However any suitable rectifier may be employed. Since a D. C. type voltage regulator is designed to operate with direct current on the potential coil, a filter assembly 15 is associated with the output of the rectifier circuit 14 to smooth out the ripple. The rectified and filtered output is applied to a potential coil 17 of the regulator, a variable resistance 18 being connected in series with the potential coil to regulate the level of the potential applied thereto. This resistance is ordinarily an integral part of the voltage regulator unit.

In adjusting a voltage regulator with a test apparatus constructed in accordance with the principles of the present invention the variable auto transformer 13 is adjusted so that the required potential is applied to the potential coil 17 of the voltage regulator. The required potential is a predetermined potential equal to the voltage to be regulated, such as the rated voltage output of the generator to be regulated. To facilitate adjustment a direct current voltmeter 21 may be connected across the output of the filter circuit 15. The voltage regulator is then adjusted in a conventional manner to provide the desired regulation. Next the full load resistor 11 is placed in the load network by closing the switch 12. The voltage regulator is then readjusted, if necessary, in a conventional manner, to provide the desired regulation. The regulated voltage value is indicated by the voltmeter 21. Where the voltage regulator is being used with a generator, when load is applied to the generator, the voltage applied to the potential coil of the regulator drops, increasing the pressure on the carbon piles and decreasing its resistance thus allowing more current to flow in the generator field circuit in order to maintain the predetermined generator output voltage. When the full load resistance 11 of the test apparatus is connected in the load network, the resulting decrease in voltage applied to the potential coil effects an increase of current flow through the carbon pile in order to maintain the predetermined direct current voltage applied to the potential coil. Thus, so far as the voltage regulator is concerned, the two situations are effectively the same except that alternating current is passing through the carbon pile instead of direct current.

Since there is alternating current in the carbon piles there is some danger of damaging the carbon discs in the adjustment procedure. For this reason it is desirable that the adjustment procedure be started with the voltage regulator pile adjusting screw tight instead of loose. The pile screw is then turned out until the voltage dip is reached and the unstable region is avoided. Since this unstable region occurs at differing points under varying conditions, it will be understood that the full load resistance used with this test apparatus must approximate the load conditions to be encountered in actual use.

While this invention has been described in conjunction with a D. C. type voltage regulator, it will be understood that this test set is equally useful with an A. C. type voltage regulator by simply omitting the rectifier circuit and filter circuit, since these elements are incorporated in the A. C. type regulator. On the other hand, where a D. C. line supply is available, the rectifier circuit and filter circuit and transformer may be eliminated, an appropriate D. C. potential control device being substituted for the transformer. However, since A. C. line supply is more generally available, a voltage regulator testing apparatus adapted for use with an A. C. power source has been illustrated and described.

While but one embodiment of this invention has been shown and described, it will be understood that many changes and modifications may be made herein without departing from the spirit or scope of the present invention.

What is claimed is:

1. In an apparatus for testing a voltage regulator of the type including variable resistance means and varying potential responsive means for controlling said variable resistance means, a source of alternating current, a network including an output circuit and resistance means adapted for coupling therein to simulate different load conditions, means adapted for applying current from said source to said network through the variable resistance means of the regulator to be tested, means producing a direct current potential from the output of said network and means adapted for applying said direct current potential to the varying potential responsive means of the regulator.

2. In an apparatus for testing a voltage regulator of the type including variable resistance means and varying potential responsive means for controlling said variable resistance means, a source of alternating current, a network including an output circuit and resistance means adapted for selective coupling therein to simulate different load conditions, means adapted for applying current from said source to said network through the variable resistance means of the regulator to be tested, rectifying and filtering means for producing a direct current potential proportional to the signal at said output circuit, and means adapted for applying said direct current potential to said varying potential responsive means of the regulator.

3. In an apparatus for use in testing a voltage regulator of the type including variable resistance means, varying potential responsive means for controlling said variable resistance means and potential level adjusting means connected in series with the varying potential responsive means, a substantially constant potential source, a network including resistance means connected thereacross to simulate different load conditions and a voltage output circuit including means for adjusting the voltage output thereof, means adapted for coupling said source to said network through the variable resistance means of the regulator to be tested, and means adapted for coupling the voltage developed at output circuit of the network across the varying potential responsive means and the potential level adjusting means of the regulator.

4. In an apparatus for testing a voltage regulator of the type including variable resistance means, varying potential responsive means for controlling said variable resistance means and potential level adjusting means connected in series with the varying potential responsive means, a substantially constant potential source, a network including resistance means connected thereacross to simulate different load conditions and a voltage output circuit including means for adjusting the voltage output thereof, means adapted for coupling said source to said network through the variable resistance means of the regulator to be tested, means adapted for coupling the voltage developed at the output circuit of the network across the varying potential responsive means and the potential level adjusting means of the regulator, indicator means for the output circuit and means adapted for indicating voltages developed across the variable resistance means.

5. In an apparatus for use in testing a voltage regulator of the type including variable resistance means, varying potential responsive means for controlling the resistance means and potential level adjusting means connected in series with the varying potential responsive means; a source of substantially constant potential; a network including resistance means connected thereacross to simulate different load conditions, an input circuit and an output circuit including means for adjusting the potential at the output circuit; means adapted for coupling said source to the input circuit of the network through the variable resistance means of the regulator to be tested; and means adapted for coupling the voltage developed at the output circuit of the network across the varying potential responsive means and the potential level adjusting means of the regulator.

6. An apparatus for use in testing a voltage regulator to be employed to regulate the output of a voltage generator, said voltage regulator being of the type including variable resistance means for controlling the field current of the generator, varying potential responsive means responsive to the voltage at the output of said generator for controlling said variable resistance means and potential level adjusting means connected in series with the varying potential responsive means, comprising a source of substantially constant potential, a network having an input and output circuit, means adapted for coupling said source to the input circuit through the variable resistance means of the regulator to be tested, and means adapted for coupling the output circuit in shunt with the varying potential responsive means and the potential level adjusting means of the regulator, said network including means for adjusting the potential at the output circuit to correspond to the rated output of the generator, first resistance means connected across the network to simulate the no load field resistance of the generator, second resistance means and switch means for connecting the second resistance means across the network to simulate load conditions.

7. An apparatus for testing a voltage regulator of the type including variable resistance means and varying potential responsive means for controlling the variable resistance means, comprising a source of alternating current, transformer means having an input circuit and an adjustable output circuit, means adapted for coupling said source to the input circuit through the variable resistance means of the regulator being tested, means adapted for coupling the output circuit to the varying potential responsive means of the regulator, and resistance means connected across said input circuit.

KARL E. LUGOSCH.

REFERENCES CITED

The following references are of record in the file of this patent:

UNITED STATES PATENTS

| Number | Name | Date |
|---|---|---|
| 1,367,845 | Turbayne | Feb. 8, 1921 |
| 1,789,031 | Mayer-Berg et al. | Jan. 13, 1931 |
| 1,857,149 | Grob | May 10, 1932 |
| 2,084,086 | Heyer | June 15, 1937 |
| 2,270,554 | Pugh | Jan. 20, 1942 |
| 2,430,381 | Whitesell | Nov. 4, 1947 |
| 2,450,012 | Master et al. | Sept. 28, 1948 |